United States Patent [19]
Iino

[11] Patent Number: 5,386,216
[45] Date of Patent: Jan. 31, 1995

[54] INDICATION DISPLAY UNIT FOR VEHICLES

[75] Inventor: Tadashi Iino, Shizuoka, Japan

[73] Assignee: Yazaki Corporation, Tokyo, Japan

[21] Appl. No.: 2,759

[22] Filed: Jan. 13, 1993

[30] Foreign Application Priority Data

Jan. 14, 1992 [JP] Japan .................................. 4-000892

[51] Int. Cl.⁶ ............................................. G09G 3/02
[52] U.S. Cl. ........................................ 345/7; 359/630; 340/980
[58] Field of Search ................... 340/705, 980; 359/13, 359/14, 630, 631, 632, 833

[56] References Cited

U.S. PATENT DOCUMENTS

| | | | |
|---|---|---|---|
| 4,635,033 | 1/1987 | Inukai et al. | 345/7 |
| 4,986,631 | 1/1991 | Aoki et al. | 359/833 |
| 5,059,956 | 10/1991 | Iino | 345/7 |
| 5,140,465 | 8/1992 | Yasui et al. | 359/631 |
| 5,172,100 | 12/1992 | Iino | 345/7 |

FOREIGN PATENT DOCUMENTS

4116043A1 11/1991 Germany .

*Primary Examiner*—Alvin E. Oberley
*Assistant Examiner*—Vivian W. Chang

*Attorney, Agent, or Firm*—Finnegan, Henderson, Farabow, Garrett & Dunner

[57] ABSTRACT

The indication display unit according to the present invention is constructed such that an image indicated by an indicator disposed within the dashboard is projected towards and reflected on a prism provided at the lower portion of the windshield so that the driver can observe the image behind the prism as the virtual image thereof, and is characterized in that the prism can be shifted namely between the first and the second positions thereof, wherein when the prism is located in the first position, the indicated image projected from the indicator is reflected on the surface of the prism and directed to the driver's visual point, whereas in the second position thereof, the prism has been completely shifted away from the driver's visual field by position shifting elements, and the indicated image projected from the indicator is thereby reflected on the inner surface of the windshield and directed to the driver's visual point. Further, the indication display unit constructed as above is also characterized in that the prism is shifted upward or downward along with the inner surface of the windshield, or that the prism is pivoted on a rotational shaft provided near the bottom surface thereof so as to be set either in the first position or in the second position thereof.

3 Claims, 2 Drawing Sheets

TO THE MOTOR ACTIVATING CIRCUIT 11

PRIOR ART

INDICATION DISPLAY UNIT FOR VEHICLES

BACKGROUND OF THE INVENTION

1. Field of the Invention

The present invention relates to an indication display unit for vehicles wherein an image projected from an indicator that indicates information concerning the vehicle movement such as a vehicle speed and so on is reflected within the visible range of the windshield near the dashboard and directed towards the driver's visual point, so that the driver can visibly observe the indicated information.

2. Description of the Prior Art

Hitherto, there have been provided various indication display units of this type, a case in point being the one as shown in FIG. 3, wherein the indicator 10 for indicating vehicle movement information such as the vehicle speed or the like is disposed within the dashboard 20 and rather in the close proximity to the windshield 30, but which windshield is formed with a reflection processing section 30a at the lower portion thereof near the border line with the dashboard 20, whereby the image projected from the indicator 10 is reflected at the reflection processing section 30a disposed on the inner surface of the windshield 30 and directed to the visual point E of the driver.

With the unit as constructed above, the projected image appears within the visible range of the windshield 30 with the reflection processing section 30a for a background, thereby forming a so-called head-up display in which the driver can visibly observe the indicated image without turning his eyes up and down frequently, and in addition to this, since the projected image is displayed in a striking contrast due to the function of this reflection processing section 30a, the driver can observe it very clearly. It is to be noted that the reflection processing section 30a can be formed in such a manner that a black ceramic coating 40 is applied to the windshield 30 as shown in FIG. 4, or that a dark-colored light intransmissive film 40' is disposed between the two glass plates forming the windshield 30 as shown in FIG. 5.

However, since the reflection processing section 30a can be clearly observed even from outside the vehicle in the conventional type indication display unit as disclosed above, it could harm the external appearance of the vehicle, and therefore such an arrangement is not preferable from the esthetic point of view. Further, due to the fact that the windshield 30 is formed with the reflection processing section 30a, in case this construction is provided as an optional device, two types of windshields 30 must be manufactured, which in fact is not preferable from the economical point of view either. And in addition, there exists also another problem that once the reflection processing object such as the reflection processing section 30a is applied to the windshield, it cannot be easily removed even in case it is no more needed afterwards.

SUMMARY OF THE INVENTION

The present invention has been made to eliminate such problems as described above, and it is an object of the present invention to obtain an indication display unit wherein a reflecting member disposed at the lower portion of the windshield of a vehicle can not be observed from outside, yet the reflection means can be easily moved away as occasion demands.

The indication display unit according to the present invention is constructed such that an image indicated by an indicator disposed within the dashboard is projected towards and reflected on a prism provided at the lower portion of the windshield so that the driver can observe the image behind the prism as the virtual image thereof, and is characterized in that the prism can be shifted namely between the first and the second positions thereof, wherein when the prism is located in the first position, the indicated image projected from the indicator is reflected on the surface of the prism and directed to the driver's visual point, whereas in the second position, the prism has been completely shifted away from the driver's visual field by a position shifting means, and the indicated image projected from the indicator is thereby reflected on the inner surface of the windshield and directed to the driver's visual point.

Further, the indication display unit according to the present invention is characterized in that it is constructed in such a manner that the prism is shifted upward or downward along with the inner surface of the windshield so as to be set either in the first position or in the second position.

And still further, the indication display unit according to the present invention is constructed such that the prism is pivoted on the rotational shaft provided near the bottom surface thereof so as to be set either in the first position or in the second position thereof.

In accordance with the above construction, when the prism is in the first position, that is, at the lower portion of the windshield, the image indicated and projected from the indicator is reflected on the surface of the prism and directed to the driver's visual point, so that the driver can observe the reflected image with the darkness for its background. On the other hand, when the prism is set in the second position either by being made to shift to the position lower than the bottom portion of the windshield by a position shifting means or to pivot on the rotational shaft provided at the bottom portion thereof, the image indicated and projected from the indicator is reflected on the inner surface of the windshield and directed to the driver's visual point, so that the driver can observe the reflected image behind the windshield as the virtual image thereof.

Other objects and features of the invention will be more fully understood from the following detailed description and appended claims when taken in conjunction with the accompanying drawings.

Figure 1:
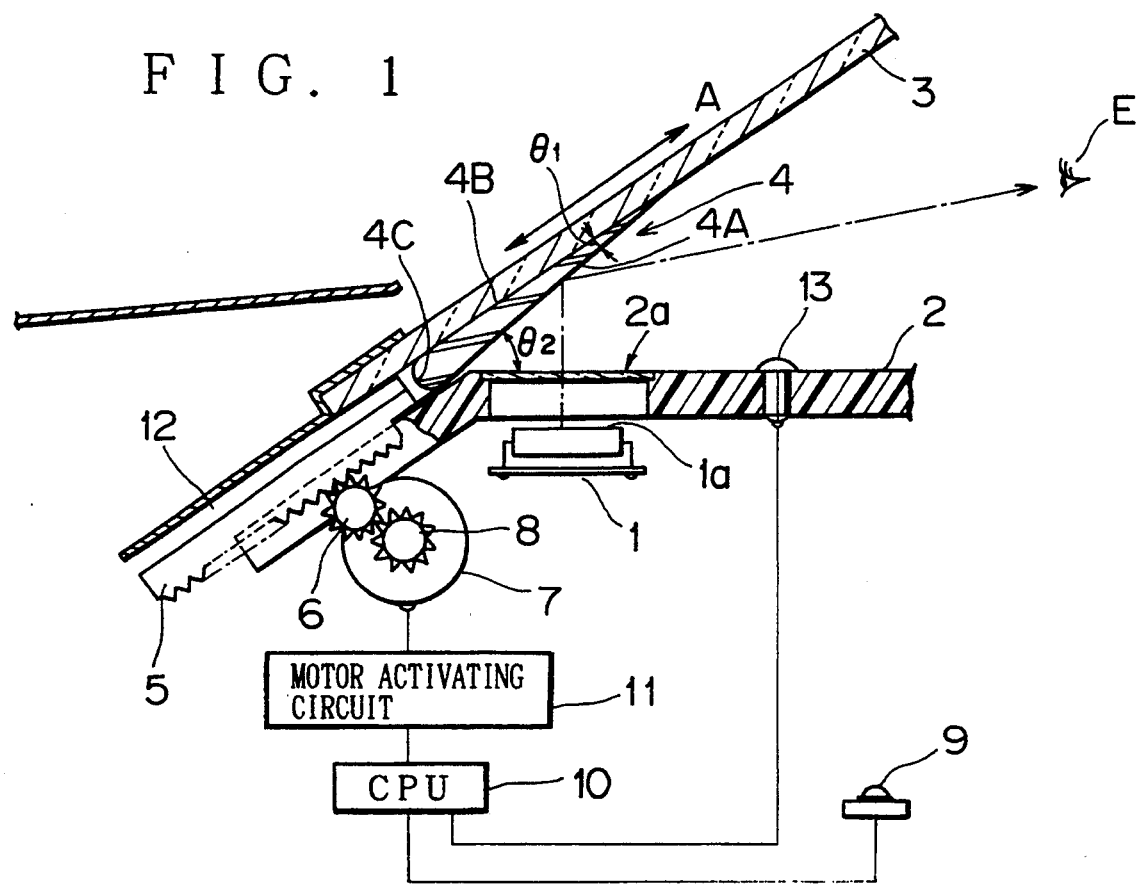
FIG. 1 is an illustration showing a side view of the indication display unit for vehicles according to a first embodiment of the present invention.

In the figures, reference numeral 1 denotes an indicator, numeral 2 denotes a dashboard, 3 a windshield, 4 a prism, and numeral 4A, 4B and 4C respectively denote a first surface, a second surface and a bottom surface of the prism 4.

DETAILED DESCRIPTION OF THE PREFERRED EMBODIMENTS

In the following, the embodiments of the present invention are described with reference to the figures, wherein a first embodiment thereof is shown in FIG. 1. As shown in the figure, the indication display unit comprises a light-emitting type indicator 1 formed by a fluorescent display tube, a back-lighted liquid crystal display or the like, which is disposed in such a manner that the indicating surface thereof is directed upward within the dashboard 2. A prism 4 is disposed at the lower portion of the windshield 3, wherein the first surface thereof 4A having its vertical angle $\theta_1$ is directed to the driver, whereas the second surface thereof 4B is disposed such that it faces along with the inner surface of the windshield. The angle $\theta_2$ which is formed between the first surface 4A and the horizontal surface of the dashboard is settled in such a manner that the light projected from the indicator 1 can be reflected toward the driver's visual point E, and this angle $\theta_2$ is set by determining the prism vertical angle $\theta_1$ in accordance with the inclination of the windshield 3.

By the way, the bottom surface 4C of the prism 4 is formed such that the sectional surface thereof is substantially in an arch shape, and a dark-colored coating is applied thereto, wherein a prism position fixing metal 5 for activating the prism 4 upward or downward is also provided underneath the bottom surface 4C. The prism position fixing metal 5 is further formed with rack gears 5a on the lower surface thereof to be engaged with the pinion gear 6, and the pinion gear 6 is further engaged with the gear 8 which is firmly fixed to the shaft of a motor 7.

In the above state as shown in FIG. 1, since the prism 4 is set in the first position, the light projected from the indicator 1 passes through the open inlet 2a of the dashboard 2, and thereafter it is reflected on the first surface 4A of the prism 4 and further directed to the driver's visual point E. From this state, if the driver operates a manual switch 9, a motor driving circuit 11 is activated by way of the CPU 10 to rotate the motor 7, whereby the prism fixing metal 5 and the prism 4 are shifted altogether toward the empty area 12 disposed lower than the bottom portion of the windshield 3 to put the prism 4 in the second position thereof, so that the light projected from the indicator 1 is reflected on the inner surface of the windshield 3 and directed to the driver's visual point E. It is to be noted that when the manual switch 9 is operated again, the motor 7 is rotated in the reverse direction by the CPU 10 and the prism 4 is shifted upward to be set in the first position thereof again.

When the prism 4 is in the first position, the external view forwardly of the windshield can not be observed from the driver's visual point E through the prism 4, since the second surface 4B of the prism 4 is inclined such that the light axis from the visual point E is inclined more than the crucial angle, and therefore the dark-colored bottom surface 4C only can be observed from the driver's visual point. For this reason, when the indicator 1 is switched on, a virtual image of the image indicated and projected from the indicator can be clearly observed with a striking contrast with the darkness for its background. It is true to say that there will be no deterioration in the external appearance at this time, since the prism 4 is observed as a transparent object.

It is to be noted that it can also be constructed in such a manner that, the prism 4 is automatically activated either upward to the first position or lowered to the second position thereof when it gets dark outside by operating the CPU 10 using an operating means (not shown) in accordance with the signal from the external light sensor 13. With this arrangement, while the outside world is still bright, an image indicated and projected from the indicator is clearly observed with a striking contrast with the dark-colored bottom surface 4C of the prism 4 for its background, and when the outside world gets dark due to the nightfall or the like, the prism 4 is automatically shifted away to the second position thereof so that the same observability as when the outside world is still bright can be obtained with the darkness outside the vehicle for its background.

In the following, a second embodiment of the present invention is described with reference to FIG. 2. It is to be noted that same reference numerals as those in FIG. 1 denote the same member, and the explanation thereof is eliminated here to avoid repetition.

Figure 2:
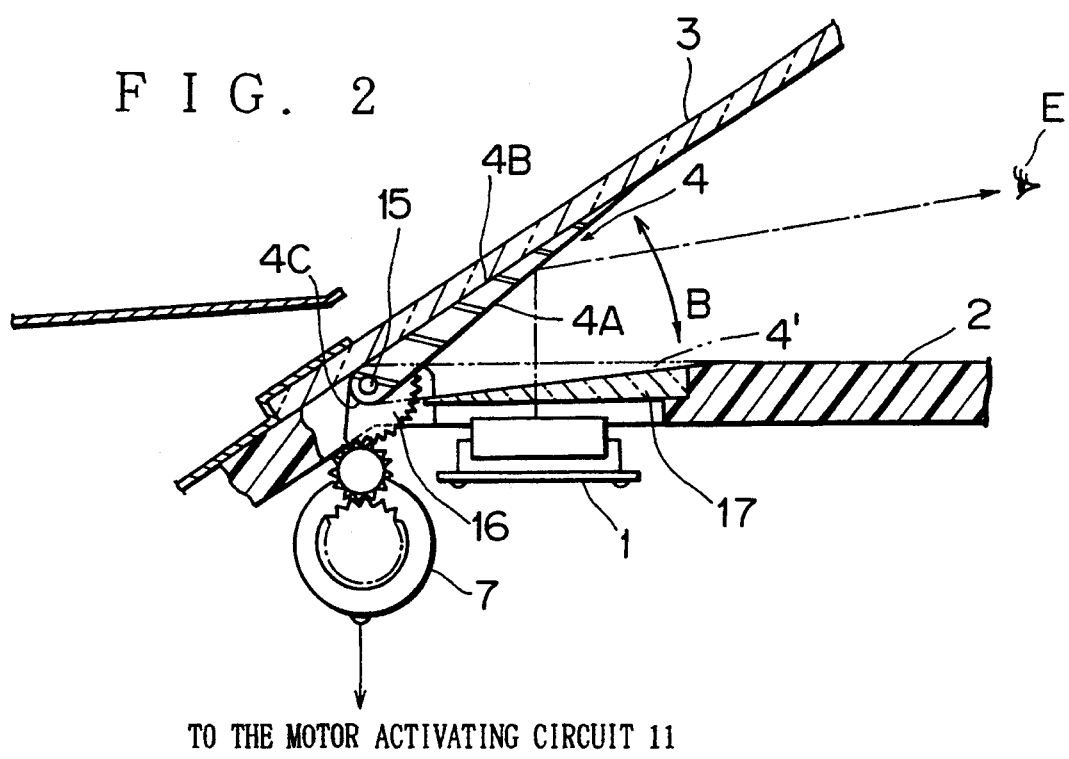
FIG. 2 is an illustration showing a side view of the indication display unit for vehicles according to a second embodiment of the present invention.
Figure 3:
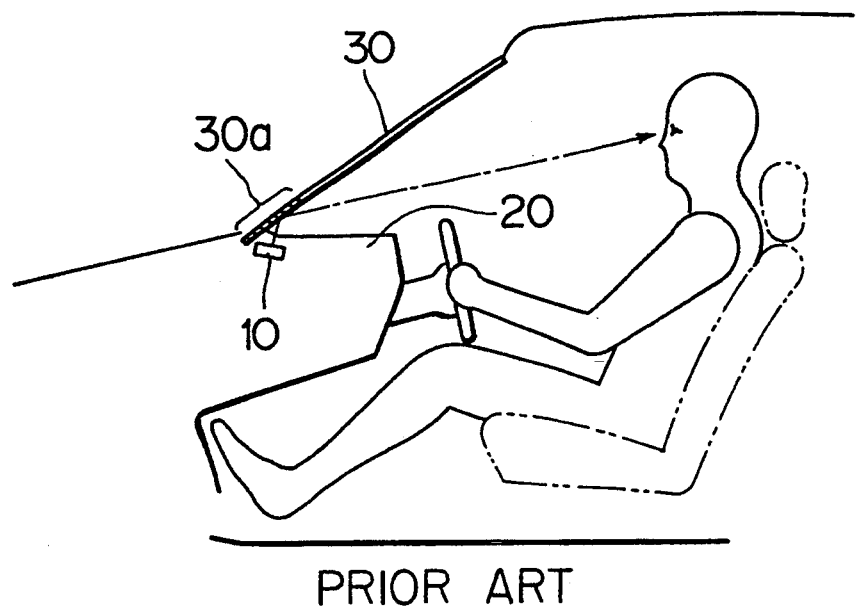
FIG. 3 is an illustration showing the side view of the conventional indication display unit for vehicles.
Figure 4:
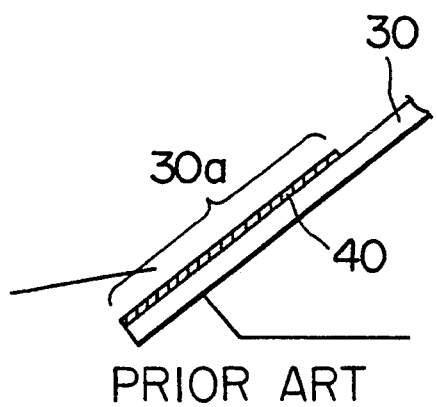
FIG. 4 is an illustration showing a magnified view of the reflection processing section of the indication display unit of FIG. 3.
Figure 5:
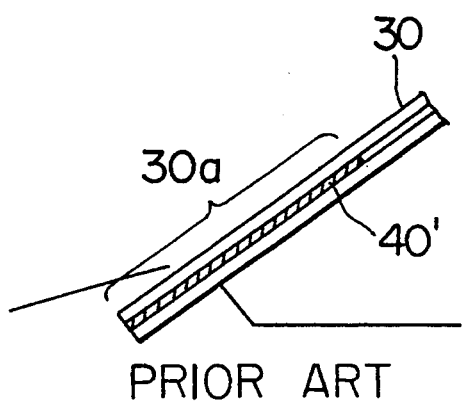
FIG. 5 is an illustration showing a reflection processing section which is differently constructed from that of FIG. 4.

The second embodiment of the present invention is different from the first embodiment in that, a rotational shaft 15 is provided at the center portion of the bottom surface 4C of the prism 4 disposed at the lower portion of the windshield 3 as shown in FIG. 2, and the rotational shaft 15 is provided with a fan-shaped gear 16 having an angle of substantially 90 degree. The gear 16 is engaged, like the first embodiment, with the pinion gear 6, and the pinion gear 6 is further engaged with the gear 8 which is firmly fixed to the shaft of the motor 7.

In the same embodiment, a second prism 17 is fitted in the open inlet 2a of the dashboard 2, wherein when the motor 7 is rotated, the prism 4 is also pivoted on the shaft 15 and rotated to the direction as shown by B toward the position 4' indicated by a dotted line, that is, to such a position that it covers over the open inlet 2a, so that the prism 4 and the second prism 17 are stuck to each other to thereby form a flat plate.

It goes without saying that the same effect as that obtained by the first embodiment can be obtained by the indication display unit for vehicles according to the second embodiment as well.

Effect of the Invention

As has been described above, according to the present invention, a prism disposed at the lower portion of the windshield does not harm the external view of the vehicle since it is observed as transparent.

Further, even if this construction is provided as an optional device, what has to be done is only to remove the prism from the lower portion of the windshield, and therefore, there is no need to manufacture two types of the windshield, thereby contributing to a reduce of the manufacturing cost thereof.

Having now fully described the invention, it will be apparent to one of ordinary skill in the art that many changes and modifications can be made thereto without departing from the spirit and scope of the invention as set forth herein.

What is claimed is;
1. An indication display unit for vehicles comprising:
   indicating means for displaying an image concerning operational information and disposed in a vehicle dashboard;

a movable prism having a first position located at a lower portion of a vehicle windshield completely within the driver's field of vision for reflecting said displayed image toward the driver's eyes, a sectional surface of the bottom portion of said prism having a dark-colored coating applied thereto; and position shifting means for changing the position of said prism from said first position to a second position located completely outside the driver's field of vision; the displayed image being always reflected outside the dashboard regardless of the position of said prism, and when said prism is in said second position, the displayed image is reflected on the inner surface of the windshield and directed to the driver's eyes.

2. An indication display unit for vehicles as claimed in claim 1, wherein said position shifting means comprises a prism position fixing member disposed in an empty space under the windshield, wherein said fixing member is activated in accordance with a rotational movement of a motor to shift said prism upward and downward along with the inner surface of the windshield to put it in one of said first and second positions.

3. An indication display unit for vehicles as claimed in claim 1, wherein said prism is further provided with a rotational shaft near the bottom surface thereof, and said position shifting means comprises a fan-shaped gear for pivoting said prism on said rotational shaft in accordance with a rotational movement of a motor so as to put said prism in one of said first and second positions.

* * * * *